United States Patent
Moore et al.

(10) Patent No.: US 10,402,726 B1
(45) Date of Patent: Sep. 3, 2019

(54) MODEL BUILDING FOR SIMULATION OF ONE OR MORE TARGET FEATURES

(71) Applicant: SparkCognition, Inc., Austin, TX (US)

(72) Inventors: Keith D. Moore, Cedar Park, TX (US); Marissa Wiseman, Austin, TX (US); Daniel P. Meador, Austin, TX (US); James R. Eskew, Austin, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/970,107

(22) Filed: May 3, 2018

(51) Int. Cl.
*G06N 3/10* (2006.01)
*G06N 7/00* (2006.01)
*G06N 3/04* (2006.01)
*G06F 3/0484* (2013.01)

(52) U.S. Cl.
CPC ........... *G06N 3/10* (2013.01); *G06F 3/04842* (2013.01); *G06N 3/0454* (2013.01); *G06N 7/005* (2013.01)

(58) Field of Classification Search
CPC ........ G06N 3/10; G06N 3/0454; G06N 7/005; G06F 3/04842
See application file for complete search history.

(56) References Cited

U.S. PATENT DOCUMENTS

| | | | |
|---|---|---|---|
| 5,461,699 A | 10/1995 | Arbabi et al. | |
| 9,990,687 B1* | 6/2018 | Kaufhold | G06T 1/005 |
| 2013/0123607 A1* | 5/2013 | Leuthardt | A61B 5/0042 |
| | | | 600/410 |
| 2013/0246017 A1* | 9/2013 | Heckerman | G06K 9/6278 |
| | | | 703/2 |
| 2017/0255952 A1* | 9/2017 | Zhang | G06O 30/0205 |
| 2017/0316324 A1* | 11/2017 | Barrett | G06Q 10/04 |
| 2018/0041536 A1* | 2/2018 | Berlin | G06N 3/04 |
| 2018/0150746 A1* | 5/2018 | Tu | G06F 17/30 |
| 2018/0275642 A1* | 9/2018 | Tajima | G01D 3/08 |

OTHER PUBLICATIONS

Higgins, I., Matthey, L., Pal, A., Burgess, C., Glorot, X., Botvinick, M., . . . & Lerchner, A. (2016). beta-vae: Learning basic visual concepts with a constrained variational framework. (Year: 2016).*
Eastwood, C., & Williams, C. K. (2018). A framework for the quantitative evaluation of disentangled representations.Pub data online Feb. 22 2018 retrieved from url <https://openreview.net/forum?id=By-7dz-AZ> (Year: 2018).*

(Continued)

*Primary Examiner* — Alexey Shmatov
*Assistant Examiner* — Oluwatosin O Alabi
(74) *Attorney, Agent, or Firm* — Toler Law Group, PC

(57) ABSTRACT

A method includes receiving an input data set, each entry including multiple features. The method includes receiving a user input identifying a target feature of the multiple features and a target value of the target feature. The method includes determining, one or more correlated features of the multiple features. The method includes providing the input data set to multiple neural networks (including multiple VAEs) to train the multiple neural networks. The method includes generating a simulated data set based on the input data set, each entry including at least the target feature and the one or more correlated features. Values of the one or more correlated features are randomized or pseudorandomized and the target feature is fixed at the target value. The method includes providing the simulated data set to the multiple neural networks to generate output data and displaying a GUI based on the output data.

20 Claims, 7 Drawing Sheets

(56) References Cited

OTHER PUBLICATIONS

YouTube Publication "Forecasting with Neural Networks: Part B" Shmueli, G. Pub. Nov. 30, 2016 retrieved from url <https://www.youtube.com/watch?v=pTJXSVi9lyQ>: See attached video transcript. (Year: 2016).*

YouTube Publication "Variational Autoencoders" Arxiv Insights Pub. Feb. 25, 2018 retrieved from url <https://www.youtube.com/watch?v=9zKuYvjFFS8&list=LL0FuhzMMq8fh6zQSWGieERw&index=6>: See attached video transcript. (Year: 2018).*

Lopez-Martin, M., Carro, B., Sanchez-Esguevillas, A., & Lloret, J. (2017). Conditional variational autoencoder for prediction and feature recovery applied to intrusion detection in iot. Sensors, 17(9), 1967. (Year: 2017).*

Zheng, J., Yang, W., & Li, X. (2017, Mar.). Training data reduction in deep neural networks with partial mutual information based feature selection and correlation matching based active learning. In Acoustics, Speech and Signal Processing (ICASSP), 2017 (pp. 2362-2366). IEEE. (Year: 2017).*

Doersch, C. (2016). Tutorial on variational autoencoders. arXiv preprint arXiv:1606.05908. (Year: 2016).*

Vargas, J. R., Novaes, S. F., Cobe, R., Iope, R., Stanzani, S., & Tomei, T. R. Shedding Light on Variational Autoencoders. (Year: 2018).*

Meng, Q., Catchpoole, D., Skillicom, D., & Kennedy, P. J. (May 2017). Relational autoencoder for feature extraction. In 2017 International Joint Conference on Neural Networks (IJCNN) (pp. 364-371). IEEE (Year: 2017).*

\* cited by examiner

MODEL BUILDING FOR SIMULATION OF ONE OR MORE TARGET FEATURES

BACKGROUND

Computers are often used to solve complex qualitative and quantitative problems. One such problem may be to simulate an outcome based on historical data. For large data sets, it may take a large amount of time or processing resources to analyze the data, understand the relationships between the components represented by the data, and generate the necessary simulation. Although some relationships may become visible from the analysis, for large data sets, the relationships between various components may be complex and inter-related, which may make determining those relationships difficult using most analysis tools. Additionally, it may be difficult to simulate results having particular values due to the large size of the input data set.

SUMMARY

The present disclosure provides systems and methods of training automated model building tools to perform simulations based on large input data sets. As used herein, features refer to quantifiable properties indicated by an input data set. In particular, the simulations may include holding a particular feature (a target feature) at a particular value (a target value) and generating an output that indicates potential values of related features that are associated with the target feature being fixed at the target value. For example, an enterprise may generate a database of information, which may be extracted as features. The features may represent values from sensors, values from a balance sheet, logistical values, or other types of values. The techniques described herein enable generation of an output that indicates some of the features that are relevant to holding the target feature at the target value. The possible values of the relevant features may be illustrated as a distribution, table, or singular outcome. If presented as a distribution, this can be done as one or more bar graphs or other plots, that illustrate the simulated values that resulted in the target feature being within a particular range (e.g., a tolerance) of the target value. The simulations may be performed using latent dimensions of data, which can be extracted using various techniques such as trained variational autoencoders or principal component analyses.

To illustrate, an input data set including multiple features may be received via a user input and ingested by a computing device. For example, a web application may display a prompt to the user asking the user to identify the input data set, the target feature, and the target value. As a particular example, the input data set may include a plurality of values from sensors on a fleet of vehicles, such as velocity measurements, altitude measurements, engine temperature measurements, fuel consumption measurements, weight measurements, or other sensor readings, and the target feature may be one of the particular values, such as fuel consumption measurements. In this example, the fuel consumption rate may be fixed at a particular amount, and simulations may be run to determine distributions of a subset of the features that are relevant to causing the fuel consumption rate to be fixed at the particular amount. For example, a distribution of values of velocity that are associated with the fuel consumption being fixed at the target value may be output and displayed, which may provide a user with insight to a velocity (or velocity range) to set in order to achieve a particular rate of fuel consumption. Although a single target feature is described, in other aspects, multiple target features may be selected and target values for each target feature may be selected.

Feature selection operation(s) may be performed to generate a selected feature set (e.g., a subset of the input data set) based on the input data set. The feature selection operation(s) may eliminate features that are incomplete, features with substantially constant values, or other "unhelpful" features. Additionally, features to be included in the selected feature set may be selected by determining features that are highly correlated (e.g., using a Pearson correlation matrix, as a non-limiting example) to the target feature and features that are indicated as highly relevant by a random forest regression model (or other type of regression model) that is fed the input data set.

After the selected feature set is determined, the selected feature set is used to train multiple automated relationship extraction models (e.g., a variational autoencoder neural network or a principal component subset) and a regression model (to be used to verify results output by the multiple automated relationship extraction models). An autoencoder is an unsupervised machine learning algorithm that encodes an input of P features into a specified number of features (Q) and that decodes a feature vector having size Q to generate a "reconstructed" output having size P, where Q is typically less than P. Thus, autoencoders can "memorize" data characteristics and output "reconstructions" of input data. A variational autoencoder (VAE) introduces randomness into the simulation optimization (e.g., the simulation process). The encoder of the VAE is trained such that each latent feature is forced to be normally distributed with a particular mean and a particular variance, which in some implementations provides a standard normal probability distribution in a latent space (e.g., each latent feature is distributed with a mean of zero and a variance of one). After training, the VAE can be used to encode data or to decode a given vector, which, via random sampling of the latent space, enables simulation of various output. In some of the techniques described herein, the VAEs are trained with the selected feature set and used to output simulations of the input data set in which the target feature is fixed at the target value. For example, the simulation output may include a distribution of possible values for each feature of the selected feature set that results in the target value being within a particular range (e.g., a tolerance) of the target value. Alternatively, the selected feature set may undergo principal component analysis (PCA) to determine a set of latent features, and the set of latent features may be sampled and perturbed to generate the output simulations. The simulation results may then be presented, e.g., via a graphical user interface, to a user to enable the user to make a decision based on the simulation results.

DETAILED DESCRIPTION

Figure 1A:
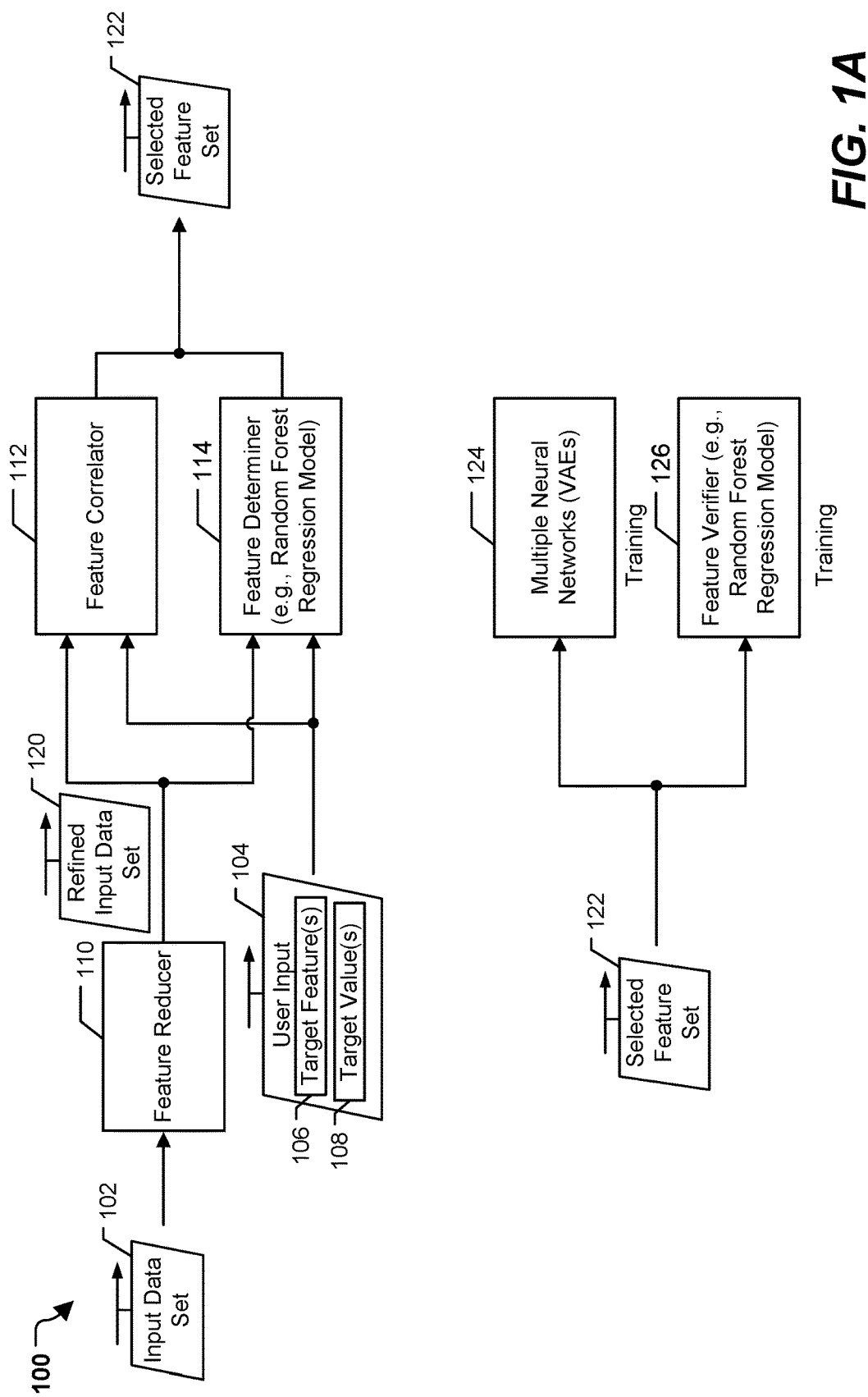
FIGS. 1A, 1B, 1C, and 1D illustrate particular implementations of systems that are operable to generate a GUI indicative of simulated values of correlated features to a target feature.
Figure 1B:
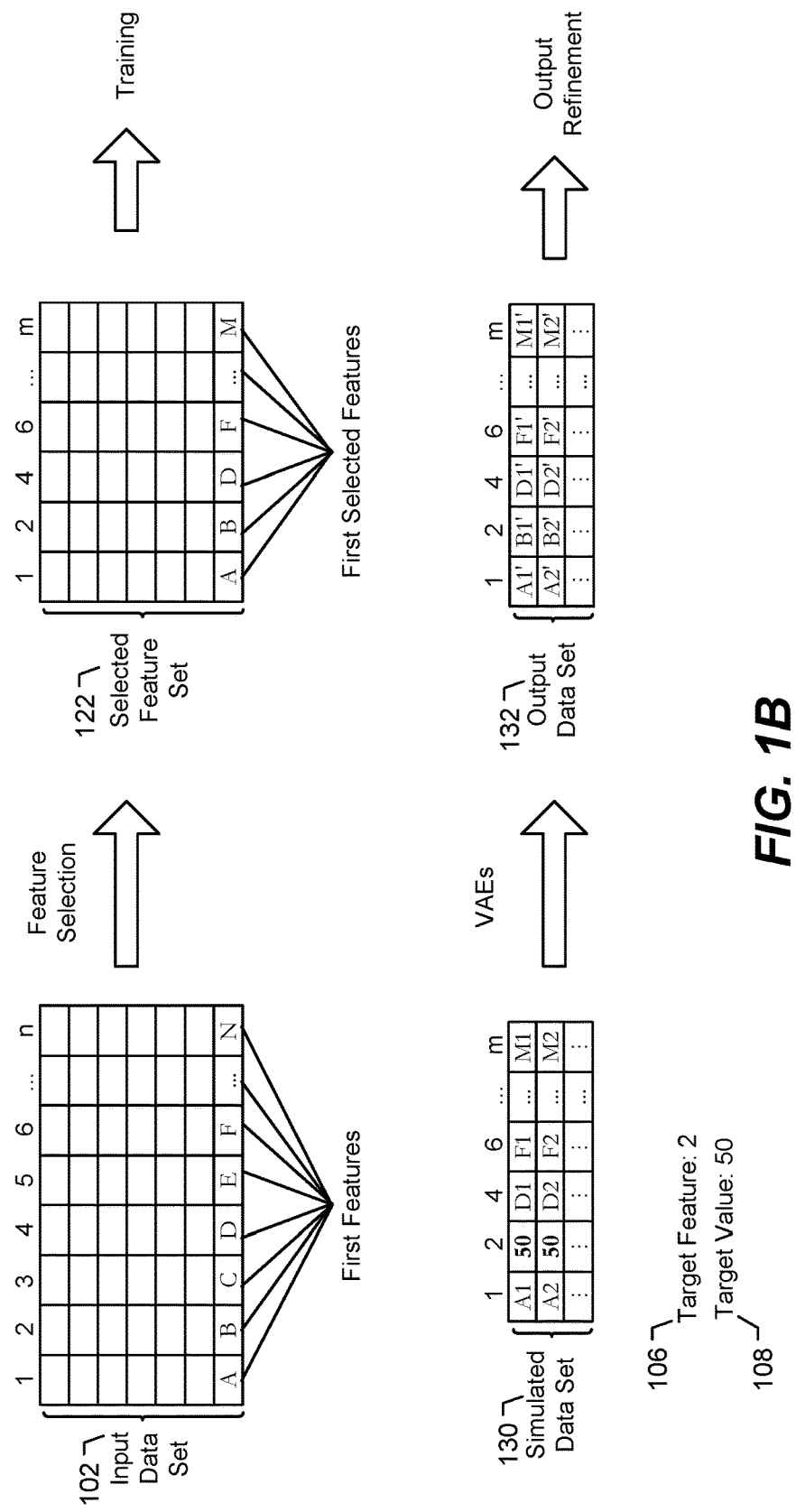
Figure 1C:
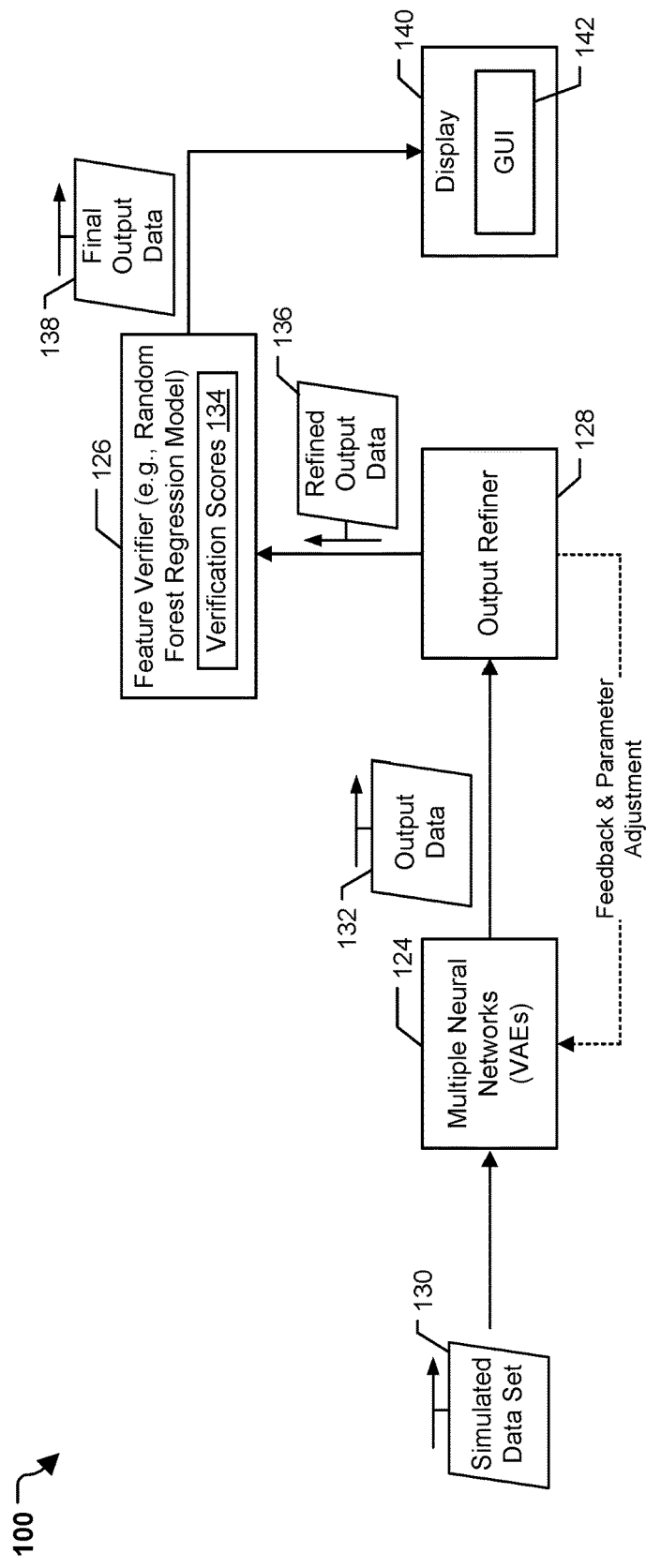

Referring to FIGS. 1A, 1B, and 1C, a particular illustrative example of a system 100 is shown. The system 100 is operable to generate an interactive forecasting and simulation-control graphical user interface (GUI) indicative of simulated values of one or more features associated with a target feature using trained neural networks, as further described herein. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a feature reducer 110, a feature correlator 112, a feature determiner 114, multiple neural networks 124, a feature verifier 126, an output refiner 128, and a display 140. As denoted in FIG. 1A and as further described herein, the multiple neural networks 124 include multiple variational autoencoders (VAEs).

It is to be understood that operations described herein as being performed by the feature reducer 110, the feature correlator 112, the feature determiner 114, the multiple neural networks 124, the feature verifier 126, or the output refiner 128 may be performed by a device executing software configured to execute the feature reducer 110, the feature correlator 112, the feature determiner 114, the feature verifier 126, or the output refiner 128 and to train and/or evaluate the multiple neural networks 124. The multiple neural networks 124 may be represented as data structures stored in a memory, where the data structures specify nodes, links, node properties (e.g., activation function), and link properties (e.g., link weight). The multiple neural networks 124 may be trained and/or evaluated on the same or on different devices, processors (e.g., central processor unit (CPU), graphics processing unit (GPU) or other type of processor), processor cores, and/or threads (e.g., hardware or software thread) which can be physical or virtual. Moreover, execution of certain operations associated with the feature reducer 110, the feature correlator 112, the feature determiner 114, the multiple neural networks 124, the feature verifier 126, or the output refiner 128 may be parallelized.

The system 100 may generally operate in two modes of operation: training mode and use mode (e.g., simulation mode). FIG. 1A corresponds to an example of the training mode and FIG. 1C corresponds to an example of the use/simulation mode.

Turning now to FIG. 1A, the system 100 may issue a prompt via a graphical user interface (GUI) to request input data, one or more target features, and one or more target values per feature. The one or more target features may be features within the input data that are to be fixed at particular values (the target values) during simulations that are run by the system 100. Output of the simulations may be displayed by the GUI, as further described herein. The user may use a user input device (e.g., a keyboard, a touchscreen, etc.) to provide a user input 104 that includes the requested information, including a location of an input data set 102, a target feature 106, and a target value 108. In some implementations, the user input 104 may also include one or more features to monitor, and those features may be included in a finalized feature set, as further described herein.

After receipt of the user input 104, the input data set 102 may be provided to the feature reducer 110. The input data set 102 may be a database or other store of information. In a particular implementation, the input data set 102 includes time-series data. The input data set 102 may include multiple features, as shown in FIG. 1B. For example, the input data set 102 may include first features. The first features may include continuous features (e.g., real numbers), categorical features (e.g., enumerated values, true/false values, etc.), and/or time-series data. In the illustrated example, the first features include n features having values A, B, C, D, E, F, . . . N, where n is an integer greater than zero. The illustrated example is not limiting, and in other examples, the first features may include fewer than 7 or more than 7 features.

Returning to FIG. 1A, the feature reducer 110 receives the input data set 102 and performs a feature reduction operation on the input data set 102 to generate a refined input data set 120. For example, the feature reduction operation may eliminate incomplete features (e.g., features that do not include values), features with substantially constant values (e.g., features that have substantially the same value), or both. The examples are not limiting, and any type of feature reduction operation may be performed. For example, user-identified features may be eliminated as part of generating the refined input data set 120. For some input data sets, such as small input data sets that contain only complete features, the feature reducer 110 may not eliminate any features. Additionally, the feature reducer 110 may be configured to convert any non-numerical features into numerical values. For example, a feature having one of two possible values, such as a feature indicating a particular state of a machine (e.g., enabled or disabled) may be converted to numerical values of 0 or 1. As another example, a feature having a fixed set of possible values may be converted into a set of one-hot encoded features (e.g., a "quartile" feature having the possible values "1," "2," "3," or "4," may be converted into four columns having possible values of 0 or 1: "Q1," "Q2," "Q3," and "Q4"). Converting features into numerical values may enable the feature values to be forecasted or modelled, as further described herein. The resulting features (e.g., the non-eliminated, numerical features) of the input data set 102 are output as the refined input data set 120.

The refined input data set 120 is provided to the feature correlator 112 and to the feature determiner 114. The feature correlator 112 is configured to receive the refined input data set 120 and an indication of the target feature 106. Although described as a single target feature, in other examples, the user input 104 may indicate multiple target features and multiple target values (e.g., a target value corresponding to each target feature). The multiple target features may include a priority target feature that represents the most important feature to constrain. In a particular implementation, if a priority features is not indicated, the first received target feature may be assigned as the priority target feature. The target feature 106 and the target value 108 represent constraints on simulations that are to be run by the system 100. For example, a user may indicate that the system 100 is to perform simulations that have the target feature 106 fixed at (e.g., set equal to) the target value 108. The outputs of the simulations (e.g., other selected features or related features, and their possible values based on the outputs of the simulations) may be presented via a GUI, as further described herein.

The feature correlator 112 may be configured to receive the refined input data set 120 and to determine one or more features that are correlated with the target feature 106. For example, the feature correlator 112 may generate a correlation matrix to determine a correlation between the target feature 106 and each feature of the refined input data set 120. Each value in the correlation matrix may correspond to a correlation coefficient between a corresponding feature and the target feature 106. In a particular implementation, the correlation coefficient is a Pearson correlation coefficient. The feature correlator 112 may output a set of features determined to be highly correlated to the target feature 106. For example, the feature correlator 112 may output features for which a correlation to the target feature 106 satisfies a threshold. To illustrate, the feature correlator may output features having a Pearson correlation coefficient that has an absolute value that is greater than (or greater than or equal to) 0.5. As another particular implementation, the feature correlator 112 may output features having the highest correlation coefficients (e.g., the j features having the highest absolute values of correlation coefficients). Although a Pearson correlation coefficient is described, in other implementations, other types of correlation coefficients may be used, such as Kendall rank correlations or Spearman rank correlations, as non-limiting examples.

The feature determiner 114 may be configured to receive the refined input data set 120 and to determine one or more features that are related to the target feature 106. In a particular implementation, the feature determiner 114 includes a regression model that is trained based on the refined input data set 120. In a particular implementation, the regression model is a random forest regression model. The random forest regression model may include a plurality of decision tree models. The random forest regression model may be configured to determine "priorities" (e.g., feature importance values) of the features of the refined input data set 120. For example, the feature importance values of features may be calculated based on node impurities (a measure of how well classes are separated at a corresponding node of a decision tree) from splitting the variables (e.g., features) averaged over all the decision trees (for regression trees, the impurity may be measured using residual sum of squares). In another implementation, the feature importance values of features are determined using permutation—for each tree, error (in a particular implementation indicated by the mean squares error) is determined, then values of a feature are permuted and the error is re-determined and compared to the original error. If there is a large difference, the particular feature has a high priority (e.g., a high feature importance value). A particular number of the highest priority features (e.g., features having the highest feature importance values) are output by the feature determiner 114. For example, the feature determiner 114 may output the twenty highest priority features. In other implementations, other types of regression models may be used, such as a linear regression model, a polynomic regression model, a step-wise regression model, a regression tree model, or another type of regression model, as non-limiting examples.

The output of the feature determiner 114 (e.g., the selected features) may be combined with the output of the feature correlator 112 (e.g., the correlated features) to generate a selected feature set 122. For example, the selected feature set 122 may include information from the input data set 102 corresponding to the features selected by the feature correlator 112 and to features selected by the feature determiner 114. The selected feature set 122 also includes the target feature 106. In some implementations, the selected feature set 122 also includes one or more user selected features. For example, the GUI may display a prompt asking for the target feature 106, the target value 108, and one or more selected features to analyze. Other features (e.g., non-selected features) are eliminated, thereby reducing the size of the selected feature set 122 as compared to the input data set 102. In other implementations, such as when the input data set 102 is small, the selected feature set 122 may include all of the features of the input data set 102.

To illustrate, FIG. 1B illustrates the selected feature set 122 after feature selection (performed by the feature reducer 110, the feature correlator 112, and the feature determiner 114 of FIG. 1). For example, prior to feature selection, the input data set 102 may include n features (e.g., features 1-n), with an illustrative first entry (e.g., feature values A, B, C, D, E, F . . . N) illustrated in FIG. 1B. After the feature selection, the selected feature set 122 includes a subset of the features of the input data set 102. For example, the selected feature set 122 may include features 1, 2 (e.g., the target feature 106), 4, 6, . . . m, where m is an integer that is less than n. The features of the selected feature set 122 may correspond to the selected features output by the feature correlator 112 or the feature determiner 114. For example, the feature correlator 112 may output a first set of features that include feature 1 and feature 6, the feature determiner 114 may output a second set of features that include feature 4 and feature m, and the selected feature set 122 may include feature 1, feature 4, feature 6, and feature m.

In a particular implementation, one or more of the feature reducer 110, the feature correlator 112, or the feature determiner 114 may be optional. For example, in some implementations, the feature reducer 110, the feature correlator 112, or the feature determiner 114 may not be included. Using fewer of the components may reduce the complexity and time associated with performing feature selection (e.g., converting the input data set 102 to the selected feature set 122).

Returning to FIG. 1A, the selected feature set 122 may be provided to the multiple neural networks 124 to train the multiple neural networks 124. The multiple neural networks 124 include or correspond to multiple VAEs. The multiple neural networks 124 may generate training output data based on the selected feature set 122. Each entry of the training output data may include feature values and variance values for the feature values. Each of the feature values of the training output data is a VAE "reconstruction" of a corresponding feature of the selected feature set 122.

Figure 2:
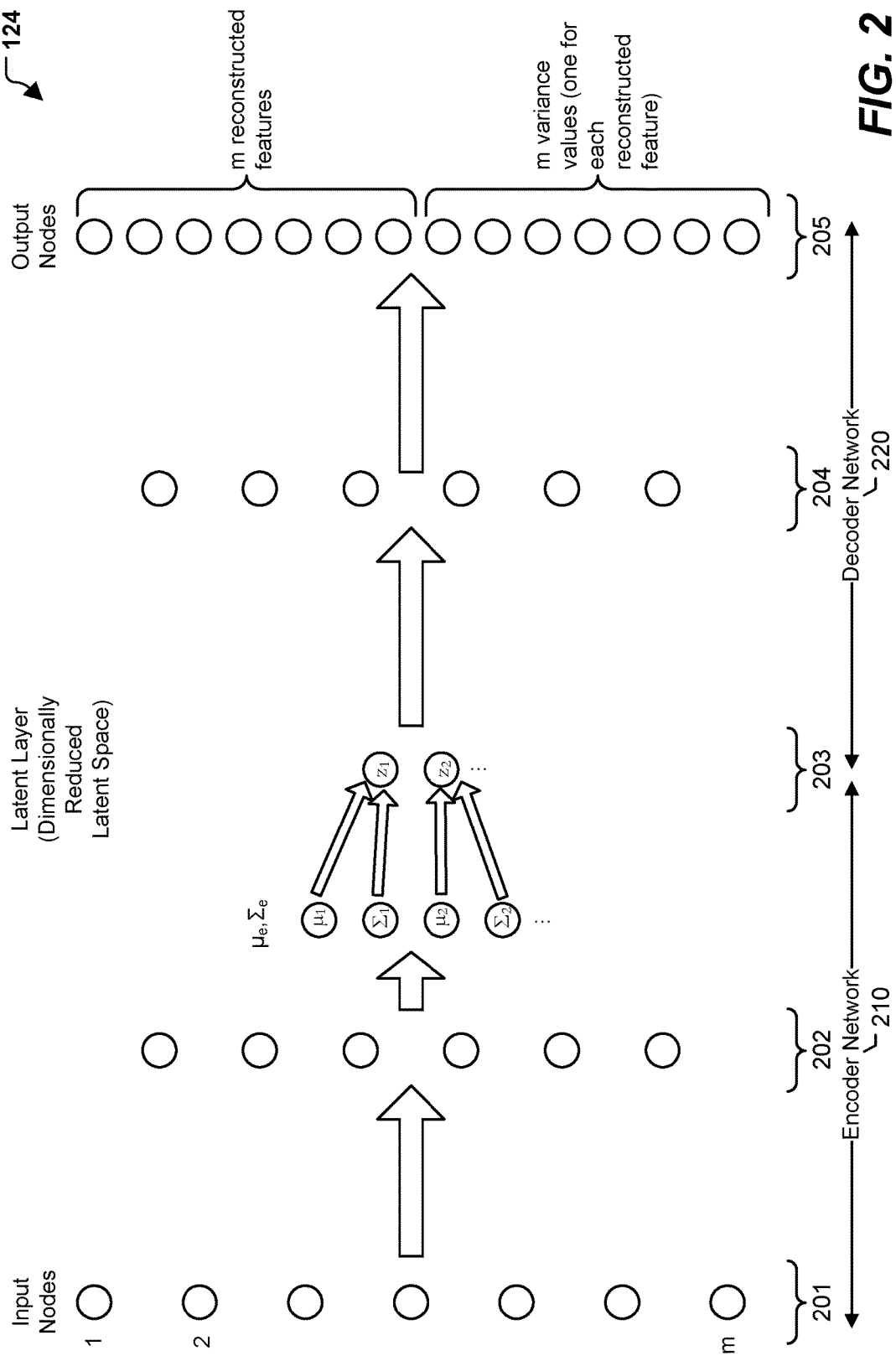
FIG. 2 is a diagram to illustrate a particular implementation of neural networks that may be included in the system of FIG. 1.

Referring to FIG. 2, each of the multiple neural networks 124 may include an encoder network 210 and a decoder network 220. The encoder network 210 may include an input layer 201 including an input node for each of the m features of the selected feature set 122. The encoder network 210 may also include one or more hidden layers 202 that have progressively fewer nodes. A "latent" layer 203 serves as an output layer of the encoder network 210 and an input layer of the decoder network 220. The latent layer 203 corresponds to a dimensionally reduced latent space. The latent space is said to be "dimensionally reduced" because there are fewer nodes in the latent layer 203 than there are in the input layer 201. The input layer 201 includes m nodes, and in some aspects the latent layer 203 includes no more than half as many nodes, i.e., no more than m/2 nodes. By constraining the latent layer 203 to fewer nodes than the input layer, the encoder network 210 is forced to represent input data (e.g., the selected feature set 122) in "compressed" fashion. Thus, the encoder network 210 is configured to encode data from a feature space to the dimensionally reduced latent space. In a particular aspect, the encoder network 210 generates values $\mu_e$, $\Sigma_e$, which are data vectors having mean and variance values for each of the latent space features. The resulting distribution is sampled to generate the values (denoted "z") in the latent layer 203. The "e" subscript is used here to indicate that the values are generated by the encoder network 210 of the VAE.

The decoder network 220 may approximately reverse the process performed by the encoder network 210 with respect to the n features. Thus, the decoder network 220 may include one or more hidden layers 204 and an output layer 205. The output layer 205 outputs a reconstruction of each of the m input features and, optionally, a variance ($\sigma^2$) value for each of the reconstructed features. Therefore, the output layer 205 may include m+m=2m nodes.

In particular aspects, topologies of the multiple neural networks 124 may be determined prior to training the multiple neural networks 124. In a first example, a neural network topology is determined based on performing principal component analysis (PCA) on an input data set, such as the selected feature set 122. To illustrate, the PCA may indicate that although the input data set includes X features, the data can be represented with sufficient reconstructability using Y features, where X and Y are integers and Y is less than X. In some aspects, Y may generally be less than or equal to X/2. It will be appreciated that in this example, Y may be the number of nodes present in the latent layer 203. After determining Y, the number of hidden layers 202, 204 and the number of nodes in the hidden layers 202, 204 may be determined. For example, each of the one or more hidden layers 202 may progressively halve the number of nodes from X to Y, and each of the one or more hidden layers 204 may progressively double the number of nodes from Y to X.

Returning to FIG. 1A, the selected feature set 122 (or a portion thereof) is also provided to a feature verifier 126 for training. The feature verifier 126 is configured, after training, to receive output data from the multiple neural networks 124 and to verify that that output data "makes sense" (e.g., that the simulation results do not include values that are outside the bounds of expectation). To illustrate, due to the non-linear nature of the VAEs, the VAEs may determine "abstract" minimas or maximas. Such determined values may be outside the bounds of expectation. For example, for a feature representing a number of personnel at a particular time, a negative number may be outside the bounds of expectation/may not be meaningful. Thus, the outputs of the multiple neural networks 124 may be compared against outputs of another model (e.g., the feature verifier 126) to reduce or eliminate potential output values that are outside the bounds of expectation or that may not be meaningful to a user. The feature verifier 126 includes a regression model. In a particular implementation, the feature verifier 126 includes a random forest regression model. In other implementations, other types of regression models, such as linear regression models, polynomial regression models, step-wise regression models, regression tree models, as non-limiting examples, may be used. The regression model may be trained based on the selected feature set 122 to be used as a verification step, as further described with reference to FIG. 1C. In a particular implementation, the regression model is trained using the features output by the feature determiner 114 (e.g., the twenty highest priority features), and the remainder of the features in the selected feature set 122 are omitted. The feature verifier 126 may be trained in parallel to the training of the multiple neural networks 124.

Referring to FIG. 1C, after training of the multiple neural networks 124 and the feature verifier 126, simulations are run using the trained multiple neural networks 124 (e.g., trained VAEs) based on the target feature 106 and the target value 108. This may be referred to as operating the system 100 in a "use" mode or "simulation" mode (as compared to a training mode described with reference to FIG. 1A). To illustrate, a simulated data set 130 is generated and provided to the multiple neural networks 124. The simulated data set 130 represents data of a plurality of simulations to be run by the multiple neural networks 124. To generate the simulated data set 130, the target feature 106 is held at (e.g., set equal to) the target value 108. For values of the other features, the last entry of the selected feature set 122 is taken, and the values are random walked forward one (or more than one) time steps to generate randomized (or pseudorandomized) values for the other features. In a particular implementation, one thousand entries of the simulated data set 130 are generated in this manner. In other implementations, more than one thousand or fewer than one thousand entries may be generated. In some implementations, the number of entries generated (e.g., the number of simulations run) may be controlled by a GUI, as further described herein.

FIG. 1B illustrates an example of the simulated data set 130. For example, for a first illustrative entry of the simulated data set 130, the value of feature 2 (e.g., the target feature 106) is set equal to 50 (e.g., the target value 108), and the values of features 1, 4, 6, . . . m are A1, D1, F1, . . . M1, respectively, which represent values determined by random walking forward the feature values A, D, F, . . . M (e.g., of a last entry of the selected feature set 122) by a time step (or a particular number of time steps). An illustrative second entry of the simulated data set 130 includes values of A2, 50, D2, F2, . . . M2 for features 1, 2, 4, 6, . . . m, respectively, which represents a random walk forward by a time step (or multiple time steps) from the first entry. This process is repeated multiple times to generate the simulated data set 130.

The multiple neural networks 124 (e.g., the multiple VAEs) may generate an output data 132 based on the simulated data set 130. For example, the multiple neural networks 124 may compress the simulated data set 130 to a latent space representation, randomly sample feature vectors from the latent space, and decode the feature vectors to generate reconstructions of the simulated data set 130 as the output data 132. Each entry of the output data 132 may represent a VAE reconstruction of a corresponding entry of the simulated data set 130. For example, a first illustrative entry of the output data 132 may include values of A1', B1', D1', F1', . . . M1' for features 1, 2, 4, 6, . . . m, respectively. Because this entry is a reconstruction, the value BF may not be exactly equal to the target value 108 (i.e., may not be equal to 50 in the example illustrated in FIG. 1B). Each entry of the output data 132 represents simulation results. The simulation results may be used to generate displayable distributions to a user, as further described herein.

Returning to FIG. 1C, after generation of the output data 132, the output data 132 may be provided to the output refiner 128. The output refiner 128 may be configured to provide feedback data to the multiple neural networks 124, to adjust a parameter of the multiple neural networks 124, or both, based on the output data 132. To illustrate, because the output data 132 includes reconstructions of input data generated by VAEs (e.g., the multiple neural networks 124), the value of the target feature 106 may not be equal to the target value 108. For example, the values of the target feature 106 may have a gaussian distribution. A difference between the mean of the distribution of values of the target feature 106 and the target value 108 may be referred to as an error associated with the output data 132. If the error is greater than a threshold, the output refiner 128 may be configured to perform an "optimization" process on the multiple neural networks 124, such as a secant optimization process or backpropagation, which causes the multiple neural networks 124 to generate additional output data. The optimization process may continue until the error associated with the output data 132 is less than or equal to the threshold. It is to be understood that characterization of any system components or method steps as "optimizers" or "optimization processes," and use of such terminology herein, is not to be interpreted as requiring such components or steps to generate optimal results to the extreme (e.g., 100% accuracy). Rather, use of such terms is to be interpreted as indicating an attempt generate an output that is improved in some fashion relative to an input.

In a first implementation, the output refiner 128 may provide a portion of the output data 132 as feedback data to the input of the multiple neural networks 124. However, the target feature 106 may be set equal to the target value 108. The feedback data may be provided as inputs to the multiple neural networks 124 as part of a secant optimization method. The multiple neural networks 124 may receive the feedback data, re-encode the feedback data, and generate new output data in which the error associated with the new output data may satisfy the threshold. In some implementations, the outputs of the multiple VAEs (the multiple neural networks 124) are ensembled to avoid values associated with local minima and local maxima. For example, entries corresponding to particular VAEs may be removed to prevent local minima or local maxima from influencing the output data 132. Additionally, or alternatively, the output refiner 128 may adjust one or more parameters of the multiple neural networks 124, such as connection weights or activation functions, in an attempt to generate output data having an error that is less than or equal to the threshold.

In a second implementation, the feedback data includes one or more latent space features instead of input features. For example, the output refiner 128 may sample the latent space that is encoded by the input layer 201 and the one or more hidden layers 202 and perturb one or more of the latent space values. Modifying the values in the latent space may reduce computational complexity and increase speed as compared to modifying values of an input data set (which then are encoded to generate the latent space). Additionally, or alternatively, the output refiner 128 may adjust one or more parameters of the multiple neural networks 124, such as connection weights or activation functions, in an attempt to generate output data having an error that is less than or equal to the threshold, for example as part of a backpropagation or other optimization process.

The output refiner 128 may also be configured to remove one or more entries of the output data 132 to generate refined output data 136. In a particular implementation, the output refiner 128 is configured to selectively remove entries of the output data 132 based on the value of the target feature 106 failing to satisfy a threshold range. As used herein, a value fails to satisfy the threshold range if the value is outside of the threshold range. The threshold range may be based on the target value 108. As a particular example, the threshold range may be within 5% above or below the target value 108. To illustrate, if the target value 108 is 50, the threshold range may be between 47.5-52.5. For each entry of the output data 132, if the value of feature 2 (e.g., the target feature 106) is between 47.5 and 52.5 (e.g., the value satisfies the threshold range), the entry may be maintained in the refined output data 136. Otherwise, the entry is removed by the output refiner 128. Although particular values of the threshold range are described, such values are not limiting and in other implementations the threshold range may be different values.

The refined output data 136 may be provided to the feature verifier 126. The feature verifier 126 may be configured to generate verification scores 134 based on the refined output data 136. The verification scores 134 may indicate whether or not each entry of the refined output data 136 is separately verified using a regression model. For example, the refined output data 136 may be provided to the trained regression model of the feature verifier 126 (which is trained using the selected feature set 122, as described with reference to FIG. 1A). The trained regression model may be the same as the regression model of the feature determiner 114 (e.g., the regression model may be retrained) or may be a different regression model (which is trained using the selected feature set 122). In a particular implementation, the trained regression model is a trained random forest regression model. For each entry, a score may be generated indicating how close the value of the target feature 106 in the output of the regression model to the target value 108. For example, if the value of feature 2 in the output data 132, B1', is within 3% of the target value 108, the first value of the verification scores 134 may be 3. The verification scores 134 may be used in selectively removing one or more entries of the output data 132.

To illustrate, feature verifier 126 may be configured to generate final output data 138, which may have fewer entries than the refined output data 136. To generate the final output data 138, the feature verifier 126 may remove one or more entries that correspond to the verification scores 134 that fail to satisfy a score threshold. As a non-limiting example, the score threshold may be 5, and the feature verifier 126 may remove entries of the output data 132 that correspond to a verification score that is greater than 5 (e.g., that fails to satisfy the score threshold). In other implementations, the score threshold may have other values. In this manner, the feature verifier 126 performs independent verification of the refined output data 136, which may account for one or more values that are outside the bounds of expectation (and which may not be meaningful to a user). In a particular implementation, the feature verifier 126 is associated with an accuracy. If the accuracy fails to satisfy an accuracy threshold, the feature verifier 126 may be disabled (e.g., additional verification may not be performed if the additional verification does not have sufficient accuracy).

Figure 3:
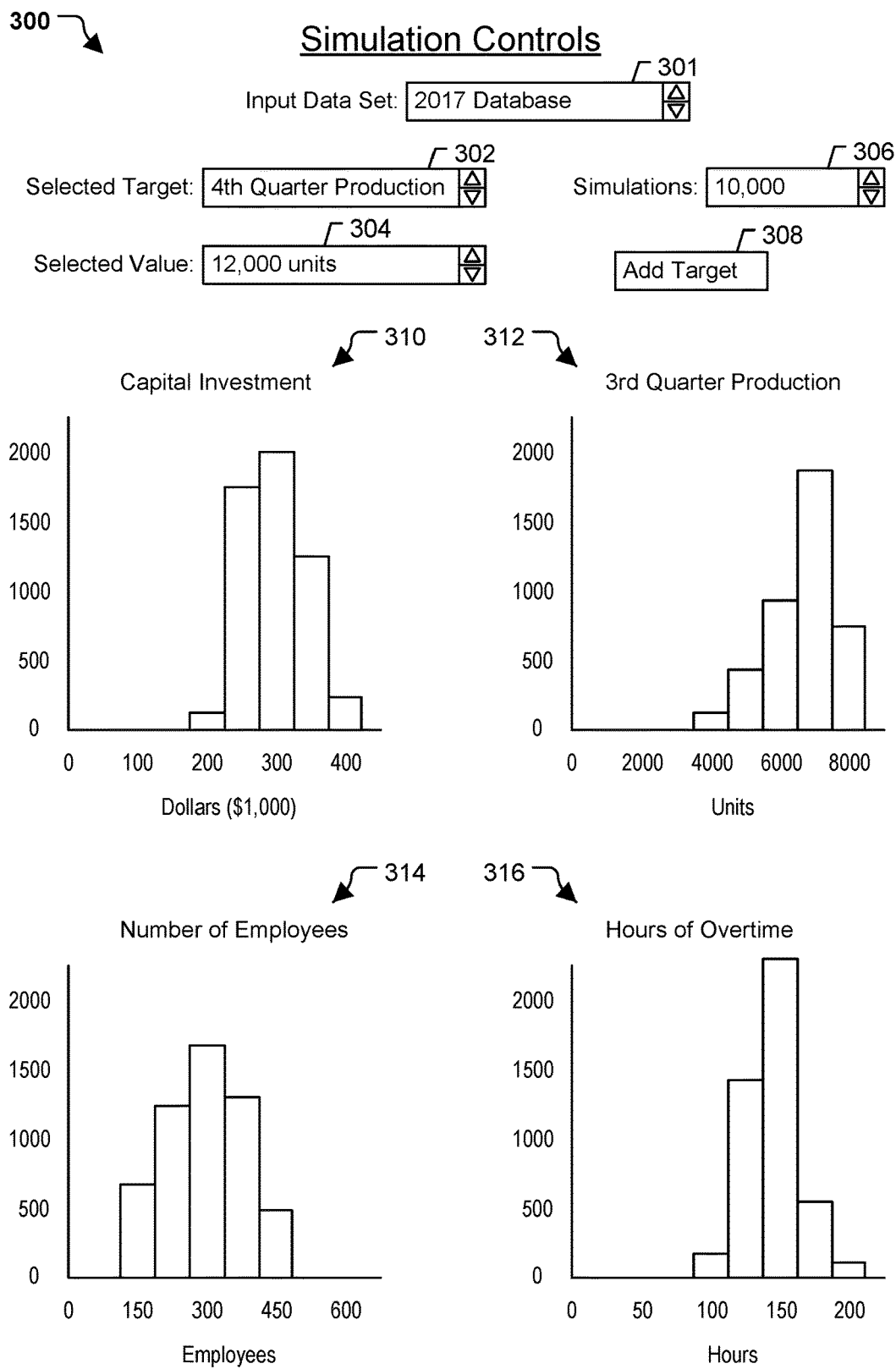
FIG. 3 is a diagram to illustrate a particular implementation of a forecasting and simulation-control graphical user interface.

After verification, the final output data 138 is provided to the display 140 for displaying data to a user. The display 140 may be configured to display a forecasting and simulation-control GUI 142. For example, the display 140 may include a touchscreen, a liquid crystal display (LCD) screen, a monitor, or some other type of display device. The GUI 142 includes information based on the final output data 138. For example, the GUI 142 may include distributions for one or more features identified in the selected feature set 122. The GUI may also be interactive and enable a user to control the simulations, such as by adding/removing/changing target features and target values, setting priorities amongst multiple target features, changing displayed features, running additional simulations, performing other control operations, or a combination thereof. FIG. 3 illustrates an example GUI 300 that includes or corresponds to the GUI 142 of FIG. 1. To illustrate, the GUI 300 may include an input data set 301, a target feature 302 ("4th Quarter Production"), and a target value 304 (twelve thousand units) (e.g., the target feature 106 and the target value 108 of FIGS. 1A-1C). The input data set 301 indicates the input data that is to be used to determine the selected feature set 122, as described with reference to FIGS. 1A and 1B. The target feature 302 and the target value 304 are user selectable prior to running the simulations. The input data set 301, the target feature 302, and the target value 304 may be modifiable by selectable indicators. In a particular implementation, the selectable indicators may include a drop-down box and arrows. In other implementations, other types of selectable indicators may be used.

The GUI 300 may also include a simulations control 306 that indicates the number of simulations to run. The simulations control 306 may be modifiable by a selectable indicator. Modification of the simulations control 306 may adjust the number of simulations that are run using the multiple trained neural networks. In some implementations, the GUI 300 also includes controls that indicate a number of models (e.g., VAEs, as described with reference to FIGS. 1A-1C, or principal component analysis models, as described herein with reference to FIG. 1D). For example, the GUI 300 may include a selectable indicator that is modifiable to set the number of VAEs that are instantiated as part of the simulation process. In this manner, the GUI 300 enables a user to instantiate multiple VAEs, to provide input data to the multiple VAEs, to execute the multiple VAEs, and to process and display output data from the multiple VAEs in the background, while using as little of the visual area (e.g., real estate) of the GUI 300 as possible. For example, a user does not have to switch between multiple screens to perform different steps of the simulation process, such as a first screen to select and instantiate a set of VAEs, a second screen to train the VAEs, and a third screen to view the results of the simulated data. Instead, as further described herein, the results are displayed on the same GUI (e.g., the GUI 300) as all control features. Thus, the speed with which a user may control the simulations is improved as compared to having multiple different GUIs or other forms of controlling the set up, training, and simulations performed by the multiple VAEs. Additionally, the controls may be easy to understand to a user, as compared to requiring the user to understand the complexities of the VAEs themselves, how the VAEs are trained, etc.

The GUI 300 may also include an add target button 308. Selection of the add target button 308 may add another selected target (with corresponding selected value) to the constraints on the simulations. When multiple target features are added, one of the target features may be identified (e.g., via a check box or other mechanism) as a priority feature. Alternatively, the first target feature that is selected may be selected as the priority feature. In other implementations, the GUI 300 may enable a user to assign a priority to each selected target feature.

The GUI 300 may also include one or more distributions of related features, such as an illustrative first distribution 310 ("Capital Investment"), a second distribution 312 ("3rd Quarter Production"), a third distribution 314 ("Number of Employees"), and a fourth distribution 316 ("Hours of Overtime"). Although illustrated as bar graphs, in other implementations, the distributions may be visually displayed in other manners.

The distributions may correspond to features that are determined to be related to the target feature (i.e., during the feature selection described with reference to FIG. 1A). For example, the first distribution 310 and the second distribution 312 may correspond to features identified by the feature correlator 112 and the third distribution 314 and the fourth distribution 316 may correspond to features identified by the feature determiner 114 of FIG. 1A. Each distribution may illustrate the number of simulations having a particular value for the corresponding feature. For example, the vertical axis may indicate the number of simulations having a given result, and the horizontal axis may indicate the particular value (in the relevant unit). The examples illustrated in FIG. 3 are for illustration and are not limiting. Other features may be displayed in additional windows of the GUI 300 and may be accessible by scrolling between windows.

Additionally or alternatively, a particular number of distributions may be displayed in the full view (e.g., with the visual distribution illustrated on-screen) and other relevant features may be indicated as tabs, buttons, etc. that enable distributions of the other features to replace the displayed distributions when selected.

In some implementations, the distributions may be interactive to control aspects of the simulations run by the multiple neural networks. For example, a user may select the first distribution 310 to cause the feature associated with the first feature to be a new target feature. A new target value may be selected by selecting a value (or location) displayed in the first distribution 310. The new target feature may replace the target feature 302 or may be added as a new target feature. Upon confirmation of the new target feature, the new target feature may be provided to the feature correlator 112 and the feature determiner 114 to modify the selected feature set 122, which may then be used to retrain the multiple neural networks 124 and the feature verifier 126 for generating additional simulations. Additionally, a relative priority of the new target feature may be set. For example, the new target feature may be indicated as the priority feature, or priority values for the previous target feature and the new target feature may be set via the GUI 300. Upon completion of the additional simulations, the distributions included in the GUI 300 may be updated, one or more distributions may be replaced with a distribution corresponding to a different feature (e.g., a feature within the modified selected feature set 122), or a combination thereof.

In this manner, the GUI 300 may enable graphical, interactive forecasting of various features (e.g., the selected feature set 122) of the input data set 301 when the target feature 302 is set to the target value 304. Additionally, the GUI 300 may enable interactive control of aspects of the training of the multiple neural networks 124 and the simulations run by the multiple neural networks 124. For example, the GUI 300 may enable a user to begin forecasting based on a particular target feature. As the user views the results (e.g., the related features displayed as distributions in the GUI 300), the GUI 300 enables the user to add (or remove) target features by clicking on the displayed features (instead of restarting the entire process). As new features (or different features) are selected as target features, the GUI 300 updates the simulations accordingly. In some cases, selection of additional target features may result in performance of a filtering operation based on the current simulation outputs to generate new distributions without retraining the multiple neural networks 124. Performing the filtering operation (instead of retraining the multiple neural networks 124) uses less computational resources to generate the new distributions. In other cases, the current output data may not provide enough information for the newly selected features, and in these cases the GUI 300 causes the multiple neural networks 124 to be trained for the new simulations. Thus, the GUI 300 is able to generate the new distributions in an efficient way that reduces the use of processing resources when possible.

In this manner, the GUI 300 enables the user to refine their forecasting and a computing device to automatically update data structures and neural network training and execution, often times based on features that the user may not expect to be related, such that the eventual results may not have been something the user initially considered or that the computing device was initially programmed for. As the user learns more about the relationship between various features, the user is able to select additional (or new) target features to constrain additional simulations, and the results may provide further insight to the relationship between various features (e.g., which features are relevant in constraining the target feature(s) to the target value(s)). This functionality is enabled using fewer operations (e.g., by clicking on displayed features) as compared to having to restart the process and perform computationally expensive operations (e.g., reset data input, reinitialize memory, write new configuration scripts, select new features, train neural networks and verification models) after each batch of simulations. Due to this interactivity and control, the GUI 300 represents an improvement over other GUIs (and command line/text-based/file-based mechanisms) that do not include such interactive features and do not enable control of the training and simulations performed by the multiple neural networks 124, or that require the additional time and operations of manually resetting options after each batch of simulations. Additionally, the GUI 300 is simplified and easy to use such that a user may use the GUI 300 to control training and operation of neural networks without understanding how the underlying neural networks operate, such as the operations of the variational autoencoders. Instead, the GUI 300 enables forecasting of values via selection of various controls.

Thus, during operation, the system 100 of FIGS. 1A-1C may be trained based on the input data set 102. To illustrate, the system 100 may display a GUI that prompts the user to identify input data (e.g., one or more files, databases, etc.), the target feature 106, and the target value 108. After receiving the user input 104, feature selection is performed on the input data set 102 by the feature reducer 110, the feature correlator 112, and the feature determiner 114 to generate the selected feature set 122 that includes features that are relevant to the target feature 106. Although a single target feature is described, in other implementations, multiple target features may be identified, each having a corresponding target value. Additionally, one of the multiple target features may be identified as a priority feature (e.g., a most important feature of the multiple target features). In such implementations, the selected feature set 122 includes features that are relevant (e.g., correlated to, have high priority, etc.) to the multiple target features. The selected feature set 122 is provided to the multiple neural networks 124 (e.g., the multiple VAEs) and to the feature verifier 126 (e.g., the random forest regression model) for training.

After training, the simulated data set 130 is generated by setting the target feature 106 equal to the target value 108 and performing a random walk for one or more time steps to generate the values of the other features. The simulated data set 130 is provided to the multiple neural networks 124 for generation of the output data 132, which includes one or more VAE reconstructions of the simulated data set 130. The output data 132 represents simulation results generated by the multiple VAEs. The output data 132 may be provided to the output refiner 128. If an error associated with the output data 132 is greater than a threshold, the output refiner 128 may provide feedback data to the multiple neural networks, perturb one or more latent features, adjust one or more parameters of the multiple neural networks 124, or a combination thereof, until the error is less than or equal to the threshold. Subsequently, the output refiner 128 passes the refined output data 136 to the feature verifier 126, which removes entries that have a verification score that fails to satisfy a threshold. The remaining entries are output as the final output data 138, which is provided to the display 140 to display the GUI 142, as described with reference to FIG. 3.

In this manner, the system 100 of FIGS. 1A-1C may be trained and then used to run simulations that set the target feature 106 equal to the target value 108. The simulations may be analyzed, and distributions of one or more related features may be displayed to a user via a GUI. The user may use the information to make a decision, to forecast expected values, or for some other purpose. Additionally, the GUI may enable user control of the forecasting, the training of the neural networks, and the simulations run by the neural networks in an interactive manner. Thus, the system 100 may be able to generate outputs for large amounts of data, through use of feature selection and training of neural networks, which may be otherwise too large or too complex to be analyzed by conventional systems. The data may be from various technological settings. As a first illustrative, non-limiting example, the data may relate to a manufacturing enterprise and may include information such as inventory, workers, schedules, capital investments, etc. As another example, the data may relate to machines, such as industrial equipment, turbines, engines, etc., that have one or more sensors. The sensors may be on-board or may be coupled to or otherwise associated with the machines. Each sensor may provide periodic empirical measurements to a network server. Measurements may include temperature, vibration, sound, movement in one or more dimensions, movement along one or more axes of rotation, etc. In other implementations, the data is from other sources.

Figure 1D:
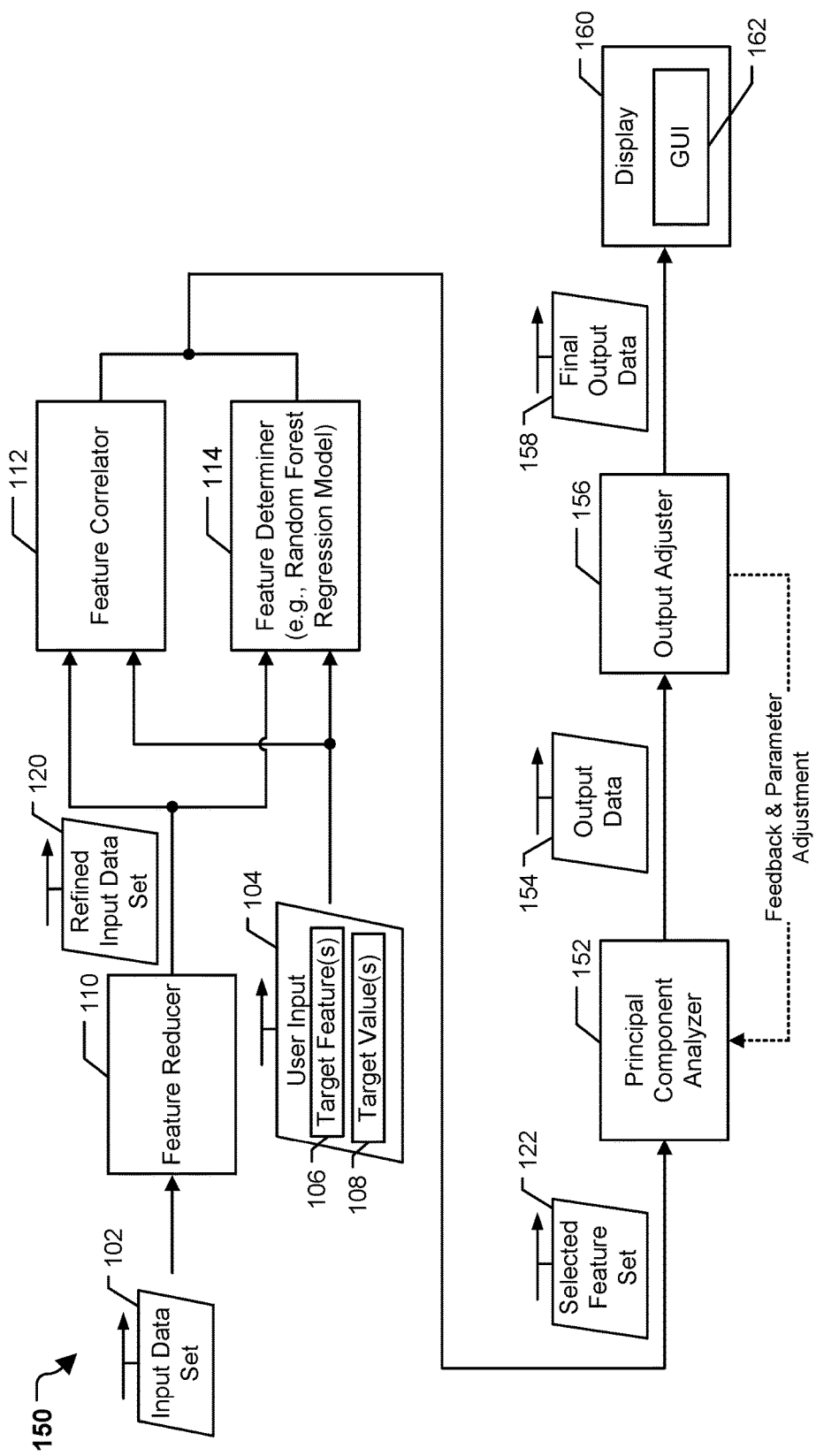

Referring to FIG. 1D, a particular illustrative example of a system 150 is shown. The system 150 is operable to generate an interactive forecasting and simulation-control graphical user interface (GUI) indicative of simulated values of one or more features associated with a target feature, similar to the system 100 of FIGS. 1A-1C. The system 150 includes the feature reducer 110, the feature correlator 112, and the feature determiner 114, as described with reference to FIGS. 1A-1C. For example, one or more of the feature reducer 110, the feature correlator 112, and the feature determiner 114 may operate on the input data set 102 to generate the selected feature set 122. The system 150 also includes a principal component analyzer 152, an output adjuster 156, and a display 160.

The principal component analyzer 152 is configured to receive the selected feature set 122 and to identify one or more principal components that are principally responsible for a threshold amount of variance in output data 154. The output data 154 may be outputs of simulations based on holding the target feature 106 at the target value 108, as described with reference to FIGS. 1A-1C. To illustrate, the principal component analyzer 152 may perform principal component analysis on the selected feature set 122 to generate a list of components that is ordered by contribution of the component to the overall variance of the output data 154. It should be noted that in some cases, one or more of the identified principal components may not be identical to any individual feature from the selected feature set 122. For example, performing the principal component analysis may transform the selected feature set 122 into components within a latent space, and at least some of the identified principal components from that latent space may indicate or account for relationships between multiple features of the selected feature set 122.

The principal component analyzer 152 may select a subset of the components that account for the threshold amount of variance in the output data 154. The threshold amount of variance may be fixed (e.g., preset) or based on a user input. In a particular implementation, the threshold variance is 90%. To illustrate, the principal component analyzer 152 may select five components that responsible for at least 90% of the variance. The selected subset of components may be adjusted as part of an optimization process.

The output adjuster 156 may be configured to provide feedback data to the principal component analyzer 152, to control one or more parameters associated with the principal component analyzer 152, or both. For example, the output adjuster 156 may be configured to perform an optimization process based on the output data 154. During the optimization process, the output adjuster 156 may cause one of the components identified by the principal component analyzer 152 to be perturbed and may analyze the effects of the perturbation on the output data 154. For example, the output adjuster 156 may perturb one or more of the components, then convert the components from the latent space back to features values (in the original feature space) in order to determine an effect on the target feature 106 of the perturbation. In some implementations, in order to convert the latent space components back to the feature values, additional components may be concatenated (e.g., via matrix operations) to the selected components prior to transformation back to feature values. Because the additional components account for a small percentage of the variance (e.g., 10% in the above example), the effect of the additional features of the target feature 106 may be negligible.

Additionally, or alternatively, the output adjuster 156 may provide feedback data. For example, the output adjuster 156 may adjust the value of the target feature 106 in the output data 154 and use the adjusted output data as feedback data to analyze the effect of modifying the target feature 106 on the components. In this manner, the output adjuster 156 may control one or more parameters of the principal component analyzer 152 to cause the target feature 106 in the output data 154 to be equal to the target value 108 (e.g., to reduce an error associated with the target feature 106). When an error associated with the output data 154 is less than or equal to a threshold (e.g., an error threshold), the output data 154 may be provided as final output data 158 to the display 160. The display 160 may display a GUI 162 based on the final output data 158. The GUI 162 may include one or more distributions of values of the selected feature set 122, similar to the GUI 142 of FIG. 1C (and the GUI 300 of FIG. 3).

In this manner, the system 150 of FIG. 1D may be used to run simulations that set the target feature 106 equal to the target value 108. The simulations may be analyzed, and distributions of one or more related features may be displayed to a user via the GUI 162. The user may use the information to make a decision, to forecast expected values, or for some other purpose. However, the system 150 of FIG. 1D uses principal component analysis in place of training and using multiple neural networks (e.g., as part of variational autoencoders) to determine the latent space, which may increase speed of the simulations as compared to using the multiple neural networks.

In a particular implementation, a system may include both the multiple neural networks 124 (and remaining components of FIG. 1C) and the principal component analyzer 152 and output adjuster 156 of FIG. 1D. Such a system may selectively provide the selected feature set 122 to either or both of the multiple neural networks 124 or to the principal component analyzer 152 based on one or more factors. To illustrate, the principal component analyzer 152 may generate simulations that constrain the target feature 106 more quickly than the multiple neural networks for smaller input data sets, but may take longer and use more processing resources for larger input data sets. In a particular implementation, the selected feature set 122 (or the input data set 102) is compared to a threshold, and if a size of the selected feature set 122 (or the input data set 102) is less than or equal to a threshold, the selected feature set 122 is provided to the principal component analyzer 152. If the size is greater than the threshold, the selected features set 122 is provided to the multiple neural networks 124. The threshold may be set at a size for which the principal component analyzer 152 and the multiple neural networks 124 are able to generate the simulations in approximately the same amount of time. In some cases, both the principal component analysis and variational autoencoders may be used and the feature value distributions presented via the GUI may be based on aggregating, averaging, or otherwise combining output from both the principal component analysis and the variational autoencoders.

Figure 4:
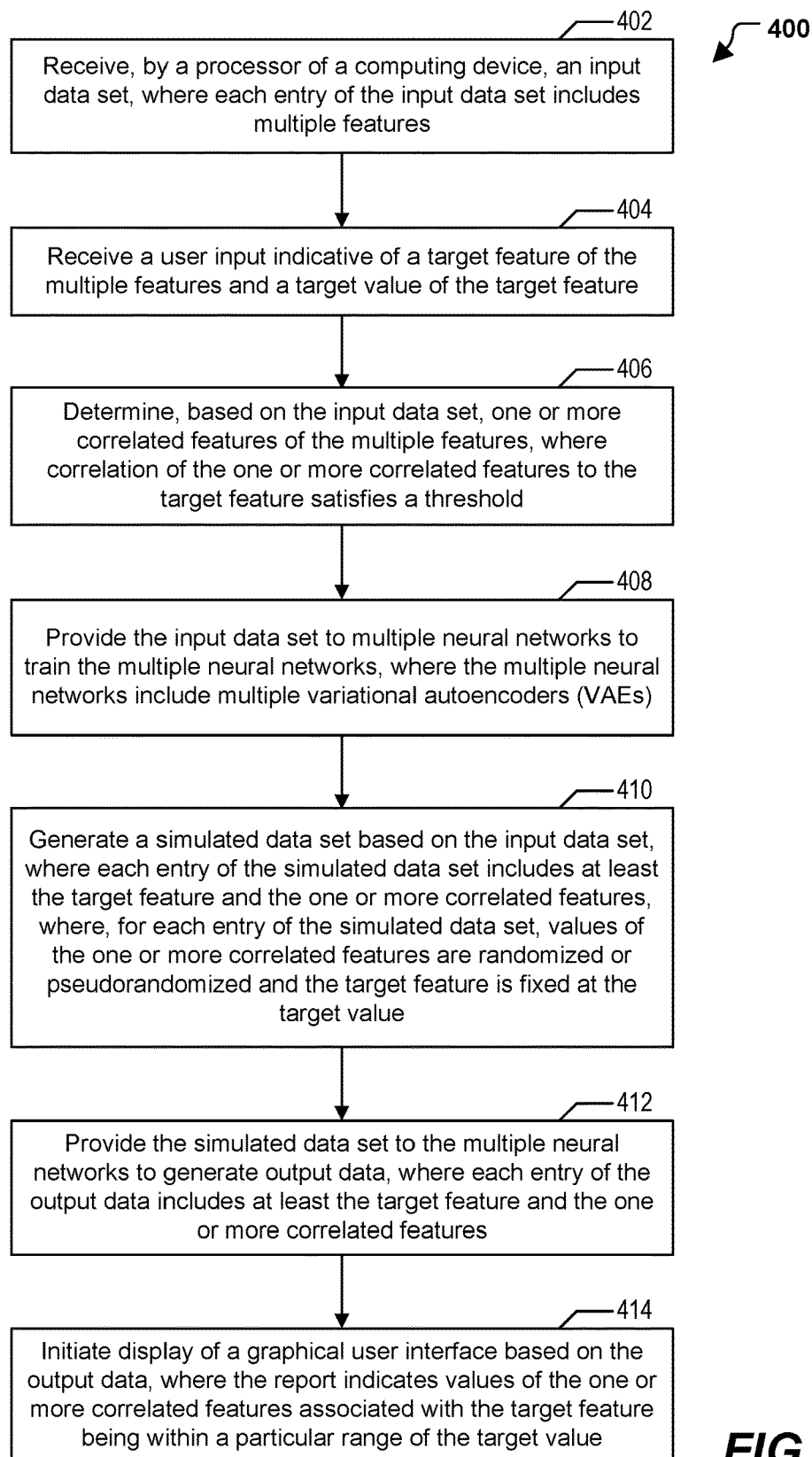
FIG. 4 is a flowchart to illustrate a particular embodiment of a method of operation at the system of FIG. 1.

Referring to FIG. 4, a particular example of a method 400 of operation of the system 100 is shown. The method 400 includes receiving, by a processor of a computing device, an input data set, at 402. The input data set includes multiple features. For example, the input data set includes the input data set 102 of FIG. 1A that includes the multiple features illustrated with reference to FIG. 1B.

The method 400 includes receiving a user input identifying a target feature of the multiple features and a target value of the target feature, at 404. For example, the user input includes the user input 104 of FIG. 1 that indicates the target feature 106 and the target value 108.

The method 400 includes determining, based on the input data set, one or more correlated features of the multiple features, at 406. Correlation of the one or more correlated features to the target feature satisfies a threshold. For example, the feature correlator 112 may determine the one or more correlated features based on the refined input data set 120 (or the input data set 102 if the feature reducer 110 is not included in the system 100). The one or more correlated features may be selected as the selected feature set 122.

The method 400 includes providing the input data set to multiple neural networks to train the multiple neural networks, at 408. The multiple neural networks include multiple variational autoencoders (VAEs). For example, the selected feature set 122 is provided to the multiple neural networks 124 to train the multiple neural networks 124, as described with reference to FIG. 1A. The multiple neural networks 124 include or correspond to multiple VAEs. To illustrate, each of the multiple neural networks may include one or more encoding layers configured to dimensionally reduce the target feature and the one or more correlated features to a latent space and one or more decoding layers configured to generate a reconstruction of the target feature and the one or more correlated features based on the input data set, as described with reference to FIG. 2.

The method 400 includes generating a simulated data set based on the input data set, at 410. Each entry of the simulated data set includes at least the target feature and the one or more correlated features. For each entry of the simulated data set, values of the one or more correlated features are randomized or pseudorandomized and the target feature is fixed at the target value. For example, the simulated data set 130 may be generated having the target feature set equal to the target value, as illustrated in FIG. 1B.

The method 400 includes providing the simulated data set to the multiple neural networks to generate output data, at 412. Each entry of the output data includes at least the target feature and the one or more correlated features. For example, the output data may include or correspond to the output data 132 generated by the multiple neural networks 124.

The method 400 further includes displaying a GUI based on the output data, at 414. The GUI indicates values of the one or more correlated features associated with the target feature being within a particular range of the target value. For example, the GUI may include or correspond to the GUI 142 that indicates values of the selected features (e.g., in the selected feature set 122). The GUI may be a single GUI that is displayed during an entirety of the simulation process, or one of multiple GUIs (e.g., a set-up GUI, a results GUI) that is displayed during the simulation process. The display 140 may display the distributions of values for the selected features, as described with reference to FIG. 3. In a particular implementation, the GUI indicates a range of possible values for at least one of the one or more correlated features that corresponds to the value of the target feature being within the particular range of the target value. Additionally, or alternatively, the GUI may enable selection of the input data set, selection of the target feature, selection of the target value, selection of a size of the simulated data set, or a combination thereof, as described with reference to FIG. 3.

In a particular implementation, the method 400 includes performing a feature selection operation on the multiple features prior to determining the one or more correlated features. The feature selection operation may eliminate incomplete features, features with substantially constant values, or both. For example, the feature reducer 110 may perform a feature selection operation on the input data set 102 to generate the refined input data set 120. In another particular implementation, the method 400 also includes determining one or more additional features based on feature importance values generated by a regression model, such as a random forest regression model, and based on the input data. The simulated data set may include random or pseudorandom values of the one or more additional features, and the output data set may include the one or more additional features. For example, the feature determiner 114 may determine one or more additional features (e.g., one or more highest priority features) from the refined input data set 120 based on the target feature 106, as described with reference to FIG. 1A.

In another particular implementation, the method 400 includes determining whether an error associated with the target feature is less than or equal to a threshold. For example, the output refiner 128 may determine whether a value of the target feature 106 is within a particular range (e.g., 5%, as a non-limiting example) of the target value 108 indicated by the user input 104. The particular range may be indicated by the user input 104 or programmed into the system 100. The method 400 may further include adjusting one or more parameters of the multiple neural networks responsive to the error being greater than the threshold. Additionally, or alternatively, the method 400 may further include providing feedback data to the multiple neural networks responsive to the error being greater than the threshold. For example, the first entry (and other entries in which the value of the target feature fails to be within the particular range of the target value) may be provided to the multiple neural networks 124 as feedback data, one or more parameters of the multiple neural networks may be adjusted, or a combination thereof, based on the output data 132, as described with reference to FIG. 1C. The feedback data may include the features of the output data, one or more latent space values, or a combination thereof, as described with reference to FIG. 1C.

In some implementations, the method 400 further includes, prior to displaying the GUI, performing a verification operation on at least a portion of the output data. For example, the output data 132 (or a portion thereof) may be provided to the feature verifier 126 to generate the verification scores 134. As described with reference to FIG. 1A, the feature verifier 126 includes a random forest regression model (or other type of regression model). The method 400 may include training the regression model based on the input data set prior to performing the verification operation. For example, the feature verifier 126 may include a random forest regression model that is trained based on the selected feature set 122. The method 400 may further include removing one or more entries from the output data prior to displaying the GUI based on a failure of the verification operation for the one or more entries. For example, the feature verifier 126 may remove a first entry if the verification score 134 associated with the first entry fails to satisfy a threshold. In a particular implementation, if an accuracy associated with the feature verifier 126 fails to satisfy an accuracy threshold, the feature verifier 126 may be disabled.

In a particular implementation, the GUI enables control of a number of simulations associated with the simulated data set, a number of variational autoencoders that are instantiated, or a combination thereof. For example, as described with reference to FIG. 3, the GUI 300 may include the simulations control 306 that controls the number of simulations that are run. Additionally or alternatively, as described with reference to FIG. 3, the GUI 300 may enable control of the number of the multiple neural networks 124 (e.g., the VAEs) that are instantiated during the simulation process.

In another particular implementation, the user input indicates multiple target features including the target feature and a corresponding target value for each of the multiple target features. For example, the user input 104 may indicate multiple target features (including the target feature 106) in addition to multiple target values such that each target feature of the multiple target features corresponds to a target value of the multiple target values. The output data may include at least values of the one or more correlated features associated with the value of each of the multiple target features being within a respective range of a respective target value. To illustrate, the simulated data set 130 may be generated such that each target features is fixed at the respective target value, and thus each entry of the refined output data 136 may have the target features within respective ranges of the target values. The user input may also indicate a priority for at least one of the multiple target values. For example, one of the multiple target values may be identified as a "priority input," or each target value may be assigned a particular priority score, as described with reference to FIG. 3.

It is to be understood that the division and ordering of steps described herein shown in the flowchart of FIG. 4 is for illustrative purposes only and is not be considered limiting. In alternative implementations, certain steps may be combined and other steps may be subdivided into multiple steps. Moreover, the ordering of steps may change.

In conjunction with the described aspects, an apparatus includes a processor and a memory storing instructions executable by the processor to perform operations including receiving an input data set. Each entry of the input data set includes multiple features. The operations include receiving a user input identifying a target feature of the multiple features and a target value of the target feature. The operations include determining, based on the input data set, one or more correlated features of the multiple features. Correlation of the one or more correlated features to the target feature satisfies a threshold. The operations include providing the input data set to multiple neural networks to train the multiple neural networks. The multiple neural networks include multiple variational autoencoders (VAEs). The operations include generating a simulated data set based on the input data set. Each entry of the simulated data set includes at least the target feature and the one or more correlated features. For each entry of the simulated data set, values of the one or more correlated features are randomized or pseudorandomized and the target feature is fixed at the target value. The operations include providing the simulated data set to the multiple neural networks to generate output data. Each entry of the output data includes at least the target feature and the one or more correlated features. The operations further include displaying a graphical user interface (GUI) based on the output data. The GUI indicates values of the one or more correlated features associated with the target feature being within a particular range of the target value.

In conjunction with the described aspects, a method includes receiving an input data set. Each entry of the input data set includes multiple features. The method includes receiving a user input identifying a target feature of the multiple features and a target value of the target feature. The method includes determining, based on the input data set, one or more correlated features of the multiple features. Correlation of the one or more correlated features to the target feature satisfies a threshold. The method includes providing the input data set to multiple neural networks to train the multiple neural networks. The multiple neural networks include multiple variational autoencoders (VAEs). The method includes generating a simulated data set based on the input data set. Each entry of the simulated data set includes at least the target feature and the one or more correlated features. For each entry of the simulated data set, values of the one or more correlated features are randomized or pseudorandomized and the target feature is fixed at the target value. The method includes providing the simulated data set to the multiple neural networks to generate output data. Each entry of the output data includes at least the target feature and the one or more correlated features. The method also includes displaying a graphical user interface (GUI) based on the output data. The GUI indicates values of the one or more correlated features associated with the target feature being within a particular range of the target value.

In conjunction with the described aspects, a computer-readable storage device stores instructions that, when executed, cause a computer to perform operations including receiving an input data set. Each entry of the input data set includes multiple features. The operations include receiving a user input identifying a target feature of the multiple features and a target value of the target feature. The operations include determining, based on the input data set, one or more correlated features of the multiple features. Correlation of the one or more correlated features to the target feature satisfies a threshold. The operations include providing the input data set to multiple neural networks to train the multiple neural networks. The multiple neural networks include multiple variational autoencoders (VAEs). The operations include generating a simulated data set based on the input data set. Each entry of the simulated data set includes at least the target feature and the one or more correlated features. For each entry of the simulated data set, values of the one or more correlated features are randomized or pseudorandomized and the target feature is fixed at the target value. The operations include providing the simulated data set to the multiple neural networks to generate output data. Each entry of the output data includes at least the target feature and the one or more correlated features. The operations further include displaying a graphical user interface (GUI) based on the output data. The GUI indicates values of the one or more correlated features associated with the target feature being within a particular range of the target value.

In conjunction with the described aspects, a computer-readable storage device stores instructions that, when executed, cause a computer to perform operations including receiving an input data set. Each entry of the input data set includes multiple features. The operations include receiving a user input identifying a target feature of the multiple features and a target value of the target feature. The operations include determining, based on the input data set, one or more correlated features of the multiple features. Correlation of the one or more correlated features to the target feature satisfies a threshold. The operations include the one or more correlated features to multiple automated relationship extraction models. The operations include receiving output data from the multiple automated relationship extraction models. For each entry of the output data, the target feature is fixed at the target value. The operations further include displaying a graphical user interface (GUI) based on the output data. The GUI indicates values of the one or more correlated features associated with the target feature being within a particular range of the target value.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, also not shown in FIG. 1, the system 100 may be implemented using one or more computer hardware devices (which may be communicably coupled via local and/or wide-area networks) that include one or more processors, where the processor(s) execute software instructions corresponding to the various components of FIG. 1. Alternatively, one or more of the components of FIG. 1 may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by a processor of a computing device, an input data set, wherein the input data set includes multiple features;
   receiving a user input identifying a target feature of the multiple features and a target value of the target feature;
   determining, based on the input data set, one or more correlated features of the multiple features prior to providing the input data set to multiple neural networks, wherein correlation of the one or more correlated features to the target feature satisfies a threshold;
   providing the input data set to the multiple neural networks to train the multiple neural networks, wherein the multiple neural networks comprise multiple variational autoencoders (VAEs);
   generating a simulated data set based on the target feature and the one or more correlated features, wherein each entry of the simulated data set includes at least the target feature and the one or more correlated features, and wherein, for each entry of the simulated data set, values of the one or more correlated features are randomized or pseudorandomized and the target feature is fixed at the target value;
   providing the simulated data set to the multiple neural networks to generate output data including forecasted values for the one or more correlated features, wherein the forecasted values of the one or more correlated features are associated with the target feature being within a particular range of the target value; and
   displaying a graphical user interface (GUI) based on the output data, wherein the GUI indicates the forecasted values of the one or more correlated features.

2. The method of claim 1, wherein each of the multiple neural networks includes one or more encoding layers configured to dimensionally reduce the target feature and the one or more correlated features to a latent space and one or more decoding layers configured to generate a reconstruction of the target feature and the one or more correlated features based on the input data set.

3. The method of claim 1, further comprising performing a feature selection operation on the multiple features prior to determining the one or more correlated features, wherein the feature selection operation eliminates incomplete features, features with constant values, or both.

4. The method of claim 1, further comprising determining whether an error associated with the target feature in the output data is less than or equal to a threshold.

5. The method of claim 4, further comprising adjusting one or more parameters of the multiple neural networks responsive to the error being greater than the threshold.

6. The method of claim 4, further comprising providing feedback data to the multiple neural networks responsive to the error being greater than the threshold, wherein the feedback data includes one or more latent space values.

7. The method of claim 4, further comprising removing one or more entries from the output data prior to displaying the GUI responsive to the error being greater than or equal to the threshold.

8. The method of claim 1, further comprising:
prior to displaying the GUI, performing a verification operation on at least a portion of the output data, wherein the verification operation is based on a trained regression model; and
removing one or more entries from the output data prior to initiating display of the GUI based on a failure of the verification operation for the one or more entries.

9. The method of claim 1, wherein the GUI indicates a range of possible values for at least one of the one or more correlated features that corresponds to the value of the target feature being within the particular range of the target value.

10. The method of claim 1, wherein the GUI enables control of a number of simulations associated with the simulated data set, a number of variational autoencoders that are instantiated, or a combination thereof.

11. The method of claim 1, wherein the user input indicates multiple target features including the target feature and a corresponding target value for each of the multiple target features, and wherein the user input indicates a priority for at least one of the multiple target features.

12. The method of claim 1, wherein determining the one or more correlated features comprises generating a correlation matrix based on the multiple features prior to providing the input data set to the multiple neural networks, wherein correlation values in the correlation matrix corresponding to the one or more correlated features satisfy the threshold.

13. The method of claim 1, wherein determining the one or more correlated features comprises running a regression model on the input data set prior to providing the input data set to the multiple neural networks, wherein the one or more correlated features are selected based on output of the regression model, and wherein the regression model is distinct from the multiple neural networks.

14. The method of claim 1, wherein determining the one or more correlated features includes:
reducing a number of features of the input data set to generate a refined input data set;
generating, using a correlation technique, a first output based on the refined input data set and an indication of the target feature;
generating, using a regression technique, a second output based on the refined input data set and an indication of the target feature; and
combining the first output and the second output to determine the one or more correlated features,
wherein the one or more correlated features exclude one or more features of the input data set.

15. An apparatus comprising:
a processor; and
a memory storing instructions executable by the processor to perform operations comprising:
receiving an input data set, wherein each entry of the input data set includes multiple features;
receiving a user input identifying a target feature of the multiple features and a target value of the target feature;
determining, based on the input data set, one or more correlated features of the multiple features prior to providing the input data set to multiple neural networks, wherein correlation of the one or more correlated features to the target feature satisfies a threshold;
providing the input data set to the multiple neural networks to train the multiple neural networks, wherein the multiple neural networks include multiple variational autoencoders (VAEs);
generating a simulated data set based on the target feature and the one or more correlated features, wherein each entry of the simulated data set includes at least the target feature and the one or more correlated features, and wherein, for each entry of the simulated data set, values of the one or more correlated features are randomized or pseudorandomized and the target feature is fixed at the target value;
providing the simulated data set to the multiple neural networks to generate output data including forecasted values for the one or more correlated features, wherein the forecasted values of the one or more correlated features are associated with the target feature being within a particular range of the target value; and
displaying a graphical user interface (GUI) based on the output data, wherein the GUI indicates the forecasted values of the one or more correlated features.

16. The apparatus of claim 15, wherein the operations further comprise training a random forest regression model based on the input data set to generate a set of additional features that are related to the target feature, and wherein the simulation data set includes random or pseudorandom values for the set of additional features.

17. The apparatus of claim 15, wherein the GUI enables selection of the input data set, selection of the target feature, selection of the target value, selection of a size of the simulated data set, or a combination thereof.

18. A computer-readable storage device storing instructions that, when executed by a processor, cause the processor to perform operations comprising:
receiving an input data set, wherein each entry of the input data set includes multiple features;
receiving a user input identifying a target feature of the multiple features and a target value of the target feature;
determining, based on the input data set, one or more correlated features of the multiple features prior to providing the one or more correlated features to multiple automated relationship extraction models, wherein correlation of the one or more correlated features to the target feature satisfies a threshold;
providing the one or more correlated features to the multiple automated relationship extraction models;
generating a simulated data set based on the target feature and the one or more correlated features, wherein each entry of the simulated data set includes at least the target feature and the one or more correlated features, and wherein, for each entry of the simulated data set, values of the one or more correlated features are randomized or pseudorandomized and the target feature is fixed at the target value;
based on the simulated data set, receiving output data from the multiple automated relationship extraction models, wherein the output data includes forecasted values for the one or more correlated features, and wherein the one or more correlated features are associated with the target feature being fixed at the target value; and displaying a graphical user interface (GUI) based on the output data, wherein the GUI indicates the forecasted values of the one or more correlated features.

19. The computer-readable storage device of claim 18, wherein the multiple automated relationship extraction models comprise principal component analysis models.

20. The computer-readable storage device of claim 18, wherein the multiple automated relationship extraction models comprise variational autoencoders.

* * * * *